United States Patent
Anderson

[19]

[11] Patent Number: 6,123,345
[45] Date of Patent: Sep. 26, 2000

[54] BACKFLOW PREVENTOR CADDY

[76] Inventor: Dennis R. Anderson, 5650 East Ave., Countryside, Ill. 60525

[21] Appl. No.: 09/071,056

[22] Filed: May 1, 1998

[51] Int. Cl.[7] ............................................. B62B 1/14
[52] U.S. Cl. ......................................... 280/47.27; 414/490
[58] Field of Search .............................. 280/47.27, 47.24, 280/79.5, 47.29, 47.131, 47.17, 47.28, 47.33; 137/215, 218; 414/490

[56] References Cited

U.S. PATENT DOCUMENTS

| | | | |
|---|---|---|---|
| D. 110,110 | 6/1938 | Eagleson | 280/47.27 X |
| 137,086 | 3/1873 | La Tourette | 280/47.27 |
| D. 340,334 | 10/1993 | Kean et al. | D34/17 |
| 2,263,879 | 11/1941 | Jorgensen | 280/47.27 X |
| 2,886,273 | 5/1959 | Wachob | 280/47.27 X |
| 3,927,898 | 12/1975 | Weyrauch | 280/47.27 |
| 4,117,856 | 10/1978 | Carlson | 137/62 |
| 4,475,570 | 10/1984 | Pike et al. | 137/218 |
| 4,531,752 | 7/1985 | Diener | 280/47.18 |
| 5,277,439 | 1/1994 | Pipes et al. | 280/47.2 |
| 5,419,569 | 5/1995 | Walls | 280/47.27 |

FOREIGN PATENT DOCUMENTS

| | | | |
|---|---|---|---|
| 2445787 | 9/1980 | France | 280/47.27 |
| 640186 | 12/1983 | Switzerland | 280/47.27 |

*Primary Examiner*—Michael Mar

[57] ABSTRACT

A backflow preventor caddy is provided including a pair elongated rails and a plurality of cross supports having a first cross support mounted between the rails, a second cross support mounted perpendicularly between the rails the first distance from the first cross support, and a third cross support mounted perpendicularly between the rails the second distance from the first cross support. The cart further includes at least one wheel assembly mounted on the rails for transporting the cart with the back flow preventor/meter mounted thereon.

1 Claim, 3 Drawing Sheets

BACKFLOW PREVENTOR CADDY

BACKGROUND OF THE INVENTION

1. Field of the Invention

The present invention relates to a backflow preventor caddy and more particularly pertains to transporting and storing a backflow preventor/meter.

2. Description of the Prior Art

The use of carts is known in the prior art. More specifically, carts heretofore devised and utilized for the purpose of transporting various items are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. Nos. 5,419,569; 4,117,856; U.S. Pat. Des. 340,334; U.S. Pat. Nos. 5,277,439; 4,531,752; and 4,475,570.

In this respect, the backflow preventor caddy according to the present invention substantially departs from the conventional concepts and designs of the prior art, and in so doing provides an apparatus primarily developed for the purpose of transporting and storing a backflow preventor/meter.

Therefore, it can be appreciated that there exists a continuing need for a new and improved backflow preventor caddy which can be used for transporting and storing a backflow preventor/meter. In this regard, the present invention substantially fulfills this need.

SUMMARY OF THE INVENTION

In view of the foregoing disadvantages inherent in the known types of carts now present in the prior art, the present invention provides an improved backflow preventor caddy. As such, the general purpose of the present invention, which will be described subsequently in greater detail, is to provide a new and improved backflow preventor caddy which has all the advantages of the prior art and none of the disadvantages.

To attain this, the present invention essentially comprises a back flow preventor/meter for hydrant applications. As shown in FIG. 1, the preventor/meter includes a linear pipe having a first end with a strainer and meter mounted thereon with a first space formed therebetween. A second end of the pipe is equipped with a first ball valve and a second ball valve with a second space formed therebetween. Such second space is distanced from the first space a first distance. An intermediate extent of the pipe has a third space formed between the meter and the first ball valve. The third space is distanced from the first space a second distance. FIGS. 1–3 show a cart including a pair elongated linear rails. Each rail has a long linear extent and a short arcuate extent. A cross bar is integrally coupled between ends of the short arcuate extents of the rails such that the rails are maintained in a horizontal parallel relationship. Further, the arcuate extents extend downwardly from the long linear extents during use. For supporting the back flow preventor/meter, the cart further includes a plurality of cross supports. As shown in FIGS. 1 & 2, the cross supports include a first cross support mounted perpendicularly between the rails adjacent the arcuate extents. A second cross support is mounted perpendicularly between the rails the first distance from the first cross support. A third cross support is mounted perpendicularly between the rails the second distance from the first cross support. Further provided as a component of the cart is an end support including a planar vertically oriented plate. The plate of the end support is equipped with a general rectangular configuration and has a lower linear edge coupled between ends of the long linear extents of the rails. A top edge of the end support has a cut out defined by a lower horizontal edge and a pair of side angled edges. For affording mobility, the cart further has a rear wheel assembly mounted to the rails with an axis thereof situated adjacent the end support.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved backflow preventor caddy which has all the advantages of the prior art carts and none of the disadvantages.

It is another object of the present invention to provide a new and improved backflow preventor caddy which may be easily and efficiently manufactured and marketed.

It is a further object of the present invention to provide a new and improved backflow preventor caddy which is of a durable and reliable construction.

An even further object of the present invention is to provide a new and improved backflow preventor caddy which is susceptible of a low cost of manufacture with regard to both materials and labor, and which accordingly is then susceptible of low prices of sale to the consuming public, thereby making such backflow preventor caddy economically available to the buying public.

Still yet another object of the present invention is to provide a new and improved backflow preventor caddy which provides in the apparatuses and methods of the prior art some of the advantages thereof, while simultaneously overcoming some of the disadvantages normally associated therewith.

Still another object of the present invention is to transport and store a backflow preventor/meter.

Lastly, it is an object of the present invention to provide a new and improved backflow preventor caddy including a pair elongated rails and a plurality of cross supports having a first cross support mounted between the rails, a second cross support mounted perpendicularly between the rails the first distance from the first cross support, and a third cross support mounted perpendicularly between the rails the second distance from the first cross support. The cart further includes at least one wheel assembly mounted on the rails for transporting the cart with the back flow preventor/meter mounted thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
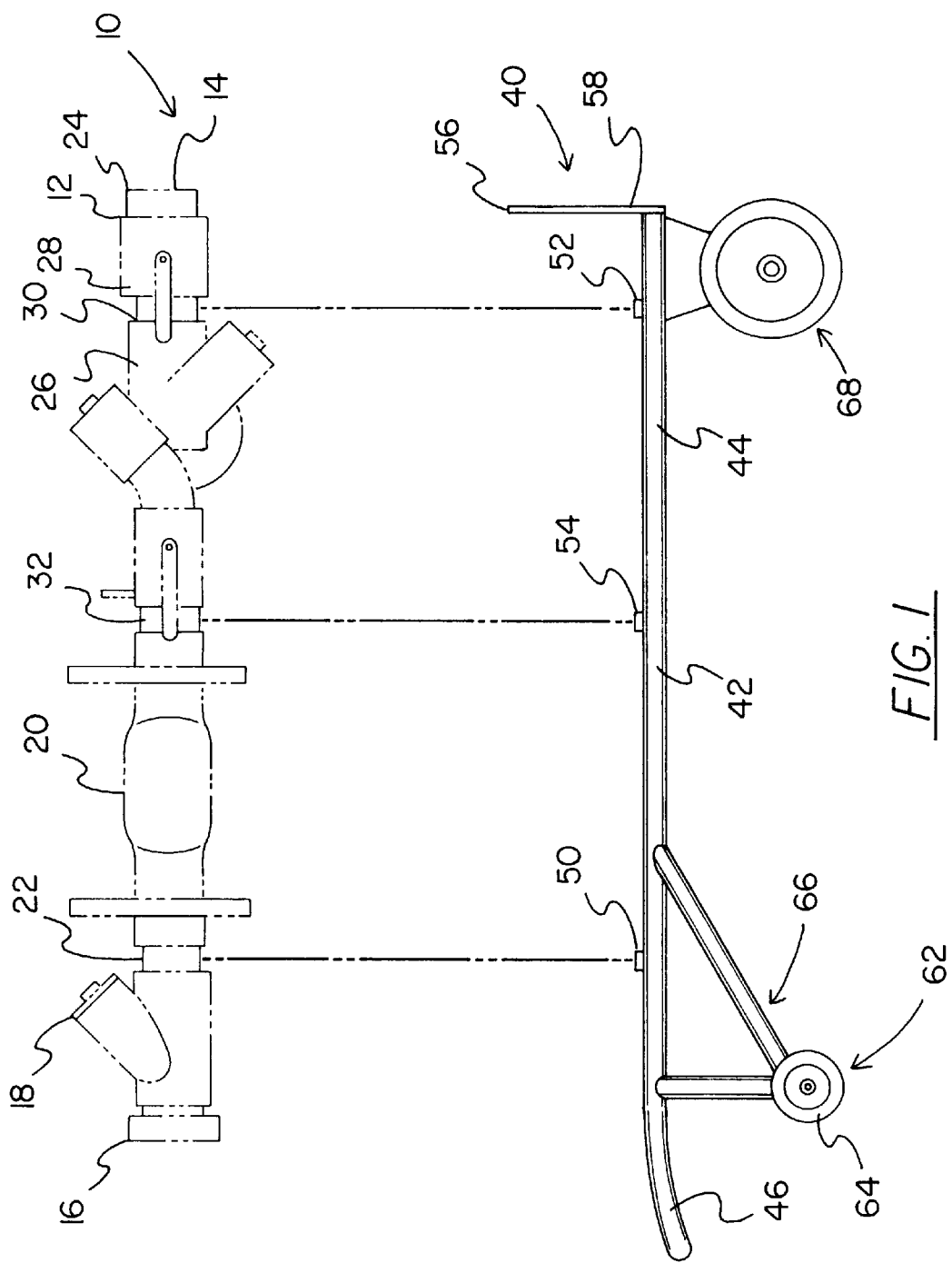
FIG. 1 is a perspective illustration of the preferred embodiment of the backflow preventor caddy constructed in accordance with the principles of the present invention.

With reference now to the drawings, and in particular to FIG. 1 thereof, a new and improved backflow preventor caddy embodying the principles and concepts of the present invention and generally designated by the reference numeral 10 will be described.

The present invention, the new and improved backflow preventor caddy, is comprised of a plurality of components. Such components in their broadest context include a back flow preventor/meter and a cart. Such components are individually configured and correlated with respect to each other so as to attain the desired objective.

More specifically, it will be noted that the system 10 of the present invention is adapted for use with a back flow preventor/meter 12 for hydrant applications. As shown in FIG. 1, the preventor/meter includes a linear pipe 14 having a first end 16 with a strainer 18 and meter 20 mounted thereon with a first space 22 formed therebetween. A second end 24 of the pipe is equipped with a first ball valve 26 and a second ball valve 28 with a second space 30 formed therebetween. Such second space is distanced from the first space a first distance and preferably comprises about 26–28 inches. An intermediate extent of the pipe has a third space 32 formed between the meter and the first ball valve. The third space is distanced from the first space a second distance. The second distance is ideally 14 inches. It should be noted that each space includes a portion of the pipe wherein nothing is mounted.

Figure 2:
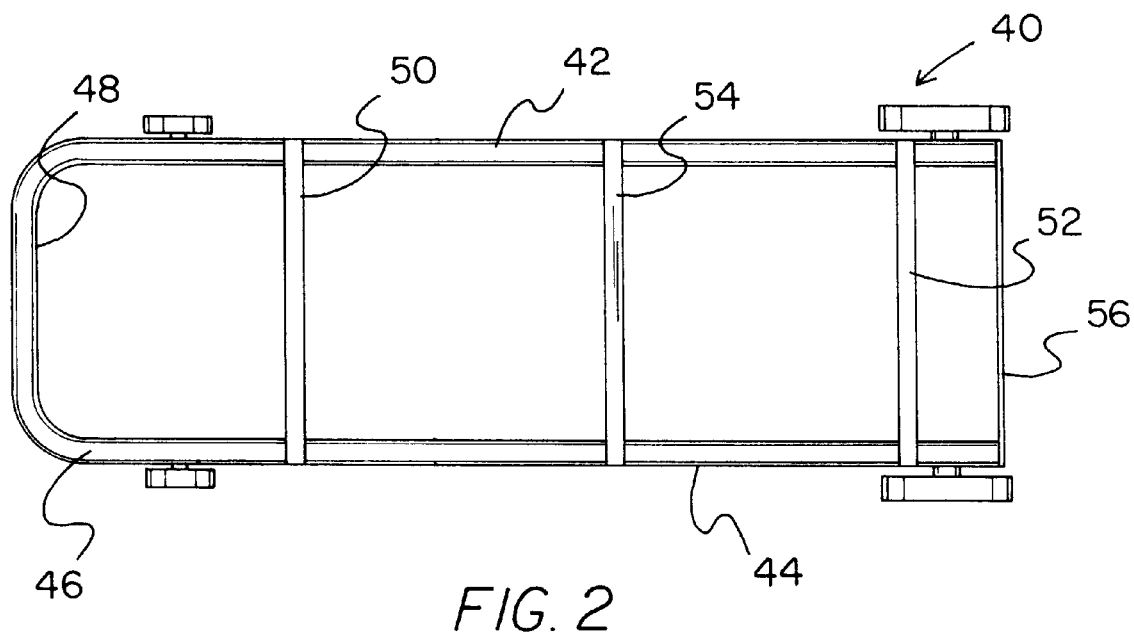
FIG. 2 is a top view of the present invention.
Figure 3:
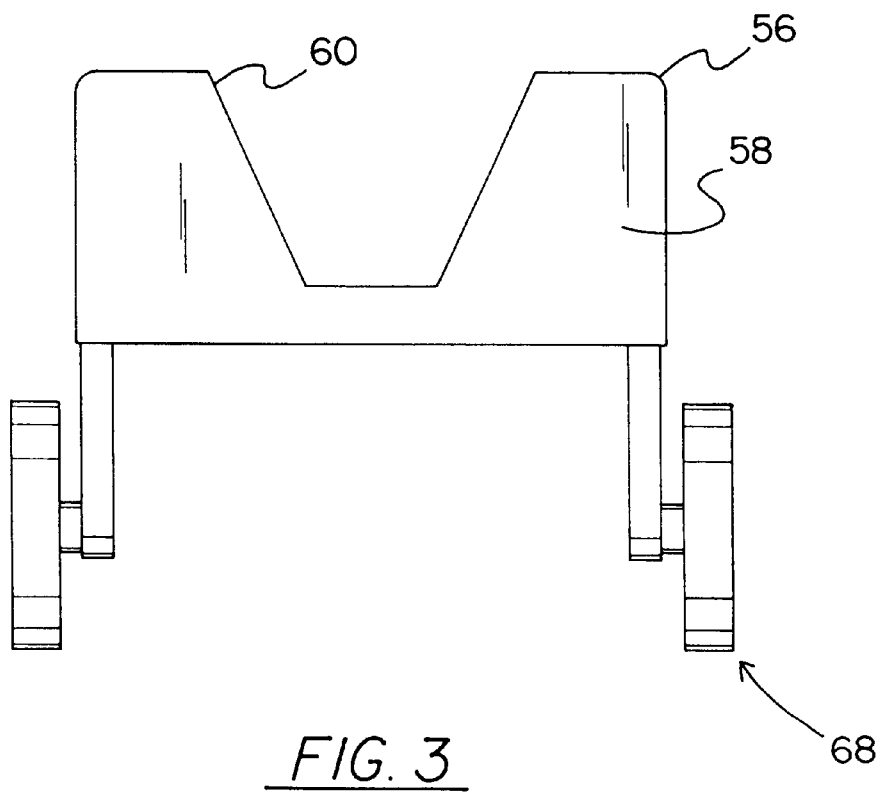
FIG. 3 is an end view of the present invention.
Figure 4:
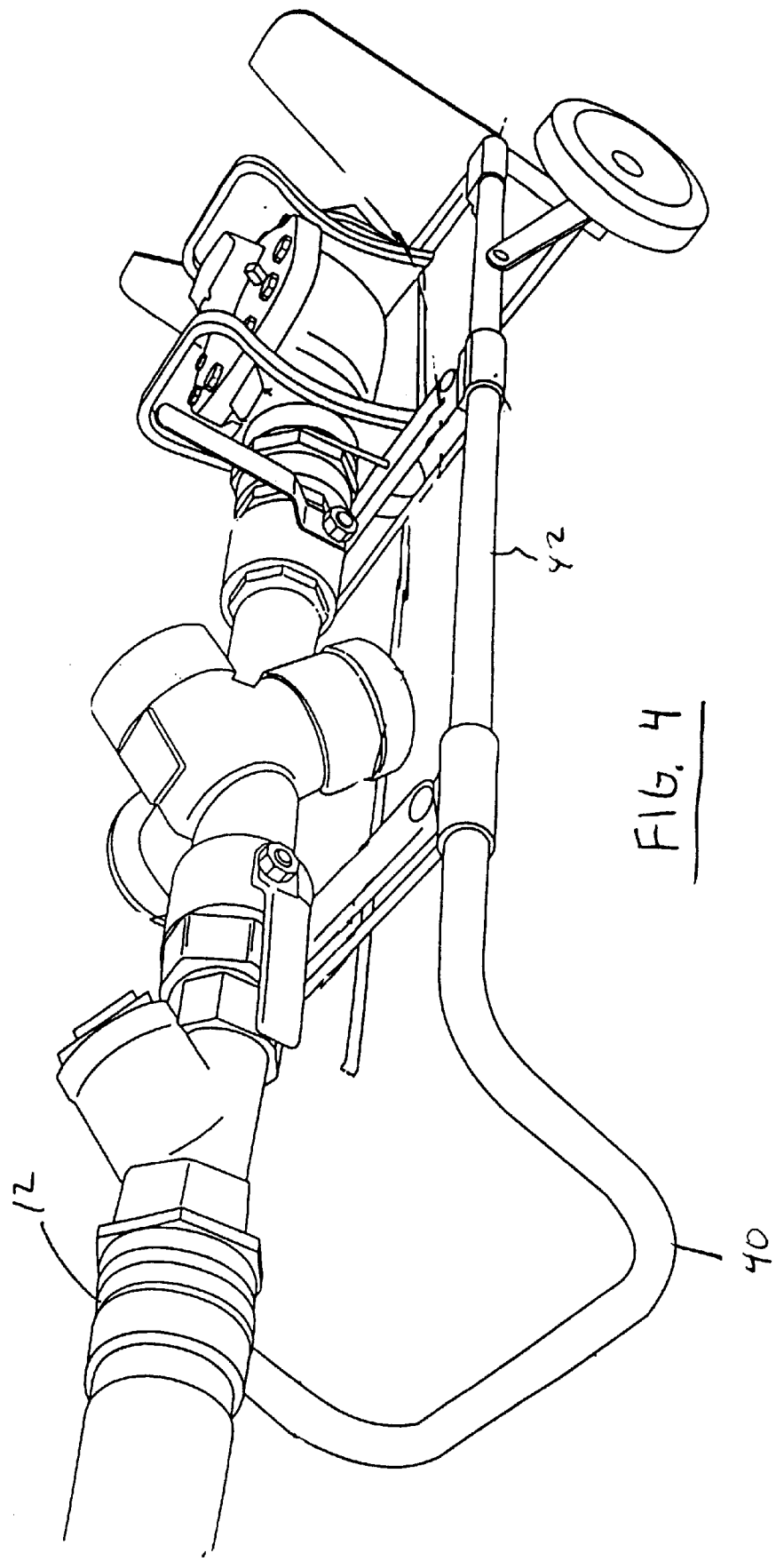
FIG. 4 is a perspective view of the present invention.

FIGS. 1–3 show a cart 40 including a pair elongated linear rails 42. Each rail has a long linear extent 44 and a short arcuate extent 46. As an option, the linear extents may be telescoping and thus have an adjustable length. The short arcuate extents each preferably have a length that is less than ⅕ the length of the long linear extents. A cross bar 48 is integrally coupled between ends of the short arcuate extents of the rails to define a handle. The cross bar ensures that the rails are maintained in a horizontal parallel relationship. Further, the arcuate extents extend downwardly from the long linear extents during use.

For supporting the back flow preventor/meter, the cart further includes a plurality of cross supports mounted between the rails. In the preferred embodiment, the coupling between the cross supports and the rails permit the cross supports to move slightly along axes associated with the rails. This may be accomplished by way of a plurality of short grooves formed in the rails. Tabs formed on ends of the cross supports may be slidably situated within such grooves during use.

As shown in FIGS. 1 & 2, the cross supports include a first cross support 50 mounted perpendicularly between the rails adjacent the arcuate extents. The first cross support is preferably at least 6 inches from the cross bar for maintaining it spaced from the back flow preventor/meter, as will become apparent. A second cross support 52 is mounted perpendicularly between the rails the first distance from the first cross support. A third cross support 54 is mounted perpendicularly between the rails the second distance from the first cross support. In the preferred embodiment, the cross supports take the form of angle irons and have a length of about 8 inches. As an option, a central extent of each cross support may be equipped with a semicircular cut out for accepting the back flow preventor/meter. Further, a plurality of inverted U-shaped brackets may be situated over the back flow preventor/meter and attached to the cross supports for maintaining the back flow preventor/meter thereon.

Further provided as a component of the cart is an end support 56 including a planar vertically oriented plate 58. The plate of the end support is equipped with a general rectangular configuration and has a lower linear edge coupled between ends of the long linear extents of the rails. A top edge of the end support has a cut out 60 defined by a lower horizontal edge and a pair of side angled edges.

For affording mobility, the cart further has a rear wheel assembly 68 mounted to the rails with an axis thereof situated adjacent the end support. The rear wheel assembly employs triangular shaped plates to support an axle associated therewith. Preferably, wheels of the rear wheel assembly have a diameter such that upon the handle, or cross bar, being rested on the ground, the rails remain level.

In use, the pipe of the back flow preventor/meter may be removably situated on the cart such that the spaces thereof rest on corresponding cross supports of the cart. Further, the second ball valve rests within the cut out of the end support. In such orientation, the back flow preventor/meter may be conveniently stored and transported.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In combination, a backflow preventor and a cart for storing and transporting the backflow preventor, comprising:

a backflow preventor for hydrant applications, the backflow preventor having a first end and a second end with a linear flow path formed therebetween, a strainer positioned at the first end, the strainer being connected to a meter by a first pipe section, the strainer being spaced from the meter to form a first recessed portion therebetween, a first ball valve connected to a second ball valve by a second pipe section, the second ball valve being positioned at the second end and being spaced from the first ball valve to form a second recessed portion therebetween, the second recessed portion being located at a first distance from the first recessed portion, the meter and the first ball valve being interconnected by a third pipe section while being spaced apart to form a third recessed portion therebetween at an intermediate extent of the backflow preventor, the third recessed portion being located at a second distance from the first recessed portion; and a cart including a pair of elongated rails, each rail having a linear portion with first and second ends and an arcuate portion extending downwardly from the first end of the linear portion when the linear portion is positioned horizontally, a cross bar integrally coupled between ends of the arcuate portions for maintaining the rails in a parallel relationship, a plurality of cross supports including a first cross support mounted perpendicularly between the linear portions adjacent the arcuate portions, a second cross support mounted perpendicularly between the linear portions and spaced from the first cross support by an amount equal to the first distance, and a third cross support mounted perpendicularly between the linear portions and spaced from the first cross support by an amount equal to the second distance, the cart further having an end support including a planar plate with a generally rectangular configuration having a lower linear edge coupled between the second ends of the linear portions, the plate extending perpendicularly from an upper side of the rails and having a cut-out portion formed along an upper edge, the cut-out portion being defined by a pair of downwardly converging, angled side edges joined by a lower horizontal edge, the lower horizontal edge being closer to the lower linear edge than the top edge, and wherein the cart further has a pair of wheel assemblies, each wheel assembly being mounted to a lower side of a respective linear portion and having an axis of rotation adjacent the end support;

whereby the backflow preventor is removably supported on the cart when the first, second, and third cross supports are received within corresponding recessed portions of the backflow preventor and the second ball valve is received within the cut-out portion of the end support, thereby permitting storage and transporting of the backflow preventor by the cart.

\* \* \* \* \*